US006999572B1

(12) United States Patent
Shaffer et al.

(10) Patent No.: US 6,999,572 B1
(45) Date of Patent: Feb. 14, 2006

(54) AUTOMATED CALL CONNECTION SYSTEM

(75) Inventors: Shmuel Shaffer, Palo Alto, CA (US); William J. Beyda, Cupertino, CA (US); Markku Korpi, Starnberg (DE)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/071,664

(22) Filed: May 1, 1998

(51) Int. Cl.
*H04M 3/42* (2006.01)

(52) U.S. Cl. ............................ 379/210.01; 379/214.01

(58) Field of Classification Search ................ 379/112, 379/142, 201, 209, 265, 210.01, 67.1, 88.21, 379/207, 221, 144.01, 88.11, 88.12, 142.01, 379/142.04, 207.11, 207.15, 214.01
See application file for complete search history.

(56) References Cited

U.S. PATENT DOCUMENTS

| | | | | |
|---|---|---|---|---|
| 4,166,929 | A * | 9/1979 | Sheinbein | 379/207 |
| 4,278,844 | A | 7/1981 | Jones | |
| 4,939,771 | A * | 7/1990 | Brown et al. | 379/88.26 |
| 5,027,387 | A * | 6/1991 | Moll | 379/115.02 |
| 5,155,761 | A | 10/1992 | Hammond | |
| 5,303,301 | A | 4/1994 | Takahata | |
| 5,311,574 | A * | 5/1994 | Livanos | 379/88.2 |
| 5,311,583 | A * | 5/1994 | Friedes et al. | 379/209 |
| 5,483,581 | A * | 1/1996 | Hird et al. | 379/132 |
| 5,590,183 | A * | 12/1996 | Yoneda et al. | 379/142 |
| 5,661,790 | A * | 8/1997 | Hsu | 379/209 |
| 5,740,229 | A * | 4/1998 | Hanson et al. | 379/67.1 |
| 5,784,438 | A * | 7/1998 | Martinez | 379/67.1 |
| 5,832,060 | A * | 11/1998 | Corlett et al. | 379/88.19 |
| 5,859,902 | A * | 1/1999 | Freedman | 379/114.02 |
| 5,884,032 | A * | 3/1999 | Bateman et al. | 379/201 |
| 5,946,386 | A * | 8/1999 | Rogers et al. | 379/265 |
| 5,987,112 | A * | 11/1999 | Chakravarti et al. | 379/209 |
| 6,005,845 | A * | 12/1999 | Svennesson et al. | 370/260 |
| 6,031,899 | A * | 2/2000 | Wu | 379/142 |
| 6,035,031 | A * | 3/2000 | Silverman | 379/209 |
| 6,075,853 | A * | 6/2000 | Boeckman et al. | 379/221.09 |
| 6,088,436 | A * | 7/2000 | Mashinsky | 379/210.01 |
| 6,169,795 | B1 * | 1/2001 | Dunn et al. | 379/209.01 |
| 6,195,418 | B1 * | 2/2001 | Ridgley | 379/88.23 |
| 6,396,906 | B1 * | 5/2002 | Kaplan | 379/67.1 |
| 6,418,217 | B1 * | 7/2002 | Ukon | 379/210.01 |
| 6,493,447 | B1 * | 12/2002 | Goss et al. | 379/265.09 |
| 6,853,636 | B1 * | 2/2005 | Merchant | 370/352 |

FOREIGN PATENT DOCUMENTS

| | | |
|---|---|---|
| EP | 0 795 922 A2 | 9/1997 |
| WO | WO 97/19548 | 5/1997 |
| WO | WO 97/24860 | 7/1997 |

* cited by examiner

*Primary Examiner*—Bing Q. Bui

(57) ABSTRACT

A method and system are provided for automatic call connection. A call back request is initiated by a first user and then sent to a second user. After the call back request is received by the second user, the second user is given the option of accepting or rejecting the call back request. If the second user accepts the call back request, then the first user is automatically connected to the second user.

21 Claims, 4 Drawing Sheets

AUTOMATED CALL CONNECTION SYSTEM

TECHNICAL FIELD

This invention relates to automatically connecting calls, and more particularly to an improved, automated system and method for connecting multi-media calls.

BACKGROUND OF THE INVENTION

Contacting someone in an urgent situation can be difficult in today's business world. One approach presently utilized includes a combination of landline telephone calls, cellular telephone calls, pager calls, E-mail messages, and the like. Some systems track a person down by trying a series of these methods in succession. Trying a series of these steps might or might not result in a connection and may not result in the most efficient or most cost effective connection. For example, a long distance telephone call to a cellular telephone might reach someone when they are sitting in their office with their landline telephone in the "do not disturb" mode. The "do not disturb" mode can automatically forward all calls to a voice messaging system or an assistant. The telephone usually does not ring while in this mode of operation. These known techniques require a sequential calling scheme which results in expensive calls. They are also intrusive because they do not allow the called party to reject the call or otherwise notify the caller with a message (e.g., a possibility of calling later).

Selective call screening is also known. In U.S. Pat. No. 4,278,844, a call screening arrangement is disclosed for an intercom communication system. The described call screening features selectively screens incoming telephone calls. The unscreened calls are selected according to the currently activated call features at the called station. This patent provides a second call screening embodiment which enables activation of a call back feature.

Call back indication is provided in U.S. Pat. No. 5,303,301. This patent describes storing data associated with a detected telephone number and reading out the stored telephone number. This information is then used to produce a dialing control signal to call back the calling party. Thus, the telephone has a caller's telephone number recognition function. The caller's telephone number can be displayed on the telephone, and the user can dial with reference to the stored telephone data to call back a calling person.

Call back requests which utilize a network are set forth in U.S. Pat. No. 5,661,790. A telecommunication system receives a call back request through a separately maintained computer network and initiates the actual call back toward the requesting subscriber using its own signaling system telecommunications network. Thus, call back subscriber features are provided which utilize two different communications networks. This patent provides a system for establishing a communications link between two subscribers located within two different countries where certain outgoing calls are restricted.

U.S. Pat. No. 4,166,929 provides an interoffice call back arrangement. A telephone switching system is disclosed with facilities for processing interoffice call back information over a common channel interoffice signaling system between program controlled call processors in call originating and terminating offices upon encountering a called station busy condition. U.S. Pat. No. 5,155,761 also provides an automatic call back system. In this system, incoming calls are answered, and if the resource desired by the caller is not then available, a robot controller informs the caller when a call back to the caller can be made. The call back time can be suggested by the robot controller or the caller can request a specific call back time. At the appropriate time, the robot controller removes the information from the call back queue, places the call and connects the desired resource.

In addition to telephone calls, computers, and computer laptops are commonly used to contact someone via, for example, E-mail. Personal digital assistants (PDAs) and pagers can also be used to contact someone. What is needed is a system and method which saves on toll charges and reaches a called person more efficiently. Media blending, computer laptops and/or PDAs can be utilized as intelligent tools to place the most expedient and economic call possible. Additionally, it is desirable to have less intrusive media used to alert a called party of an incoming urgent call.

SUMMARY OF THE INVENTION

Contacting someone immediately can be a difficult task. Letting someone know you need to reach them can be accomplished in a number of ways (e.g., voice mail message, facsimile, pager message, etc.). The present invention allows a caller to leave a call request with a called party in a special server that will perform the notification function to the called party. This special server also handles the acceptance or rejection of the call, notification to the caller and media blending. It can be used by employees at the same business site to expedite connections between employees. It can also be used from remote locations to reach people more effectively and to save on telephone call charges or toll charges.

A method and system are provided for automatic call connection. A call back request is initiated by a first user and then sent to a second user. After the call back request is received by the second user, the second user is given the option of accepting or rejecting the call back request. If the second user accepts the call back request, then the first user is automatically connected to the second user.

DESCRIPTION OF THE PREFERRED EMBODIMENT

Figure 1:
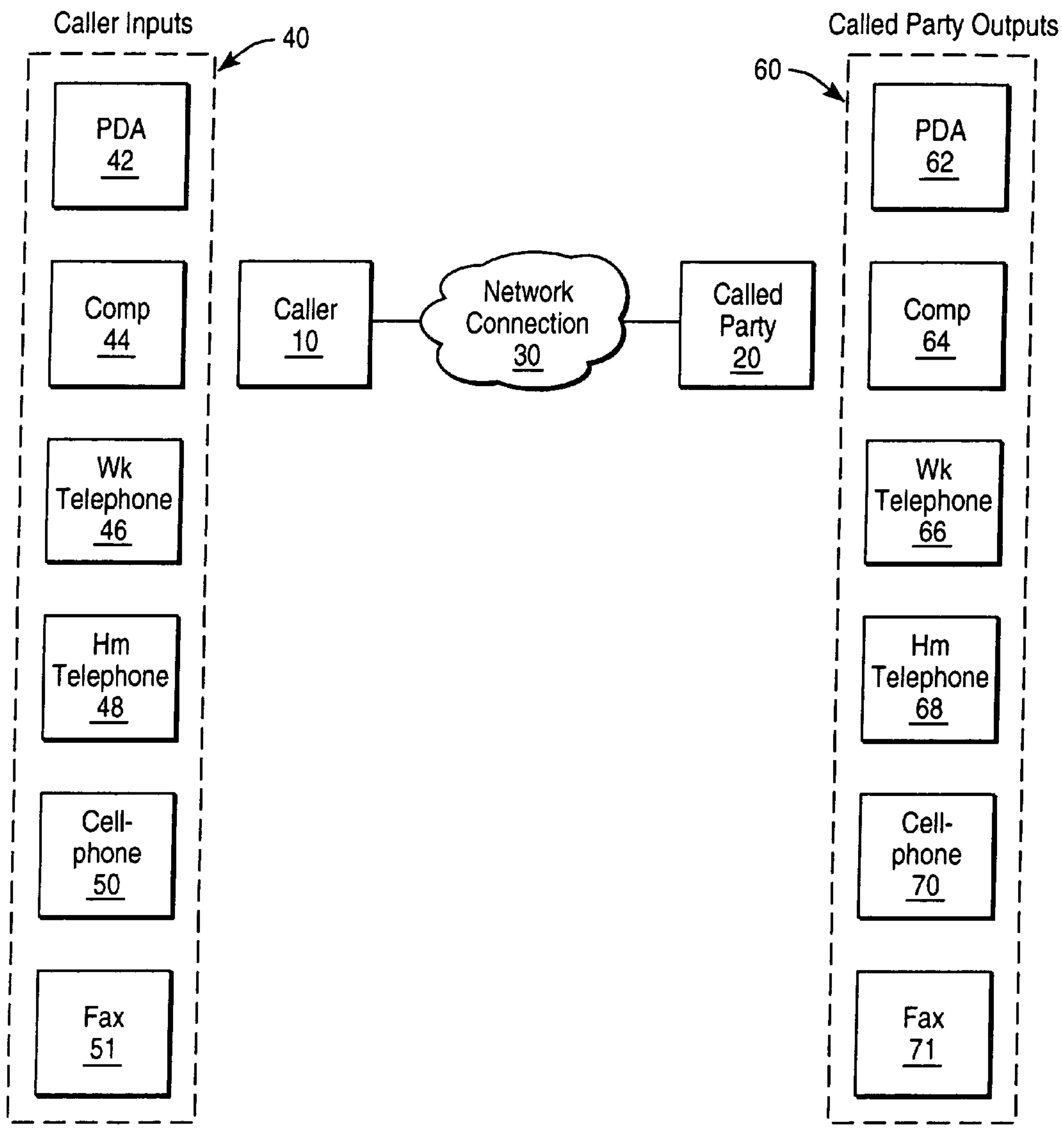
FIG. 1 provides an environment for the present invention.

FIG. 1 provides an environment for the present invention. A caller 10 is connected to a called party 20 via a network connection 30. Network connection 30 can be any commercially available network connection (e.g., a packet based network). Caller 10 has multiple caller inputs 40 available. These caller inputs 40 include, for example, a personal digital assistant (PDA) 42, a personal computer (e.g., a laptop computer) 44, a workplace telephone 46, a home telephone 48, a cellular telephone 50 and facsimile machine 51. Similarly, called party 20 has called party outputs 60. These called party outputs 60 include, for example, a personal digital assistant (PDA) 62, a personal computer 64, a workplace telephone 66, a home telephone 68, a cellular telephone 70 and a facsimile machine 71. Caller 10 uses one of caller inputs 40 to communicate with called party 20. This communication utilizes one of called party outputs 60, and the connection is made via network connection 30. For example, caller 10 can utilize home telephone 48 to call workplace telephone 66 via network connection 30. When called party 20 answers work telephone 66, caller 10 and called party 20 are connected. In one embodiment of the present invention, caller 10 utilizes PDA 42 to contact work telephone 66. PDA 42 can be, for example, 3COM's commercially available Palm Pilot. In this embodiment, work telephone 66 has a visual display. The identification of caller 10 is provided in data sent by PDA 42 such that this identification information can be displayed on work telephone 66. Called party 20 can consider the displayed caller identification information before deciding whether to take the call placed by caller 10 via PDA 42. If called party 20 decides to take the call, work telephone 66 may, depending on the system configuration, automatically dial the telephone number for cellular telephone 50 in order to connect called party 20 with caller 10.

Figure 2:
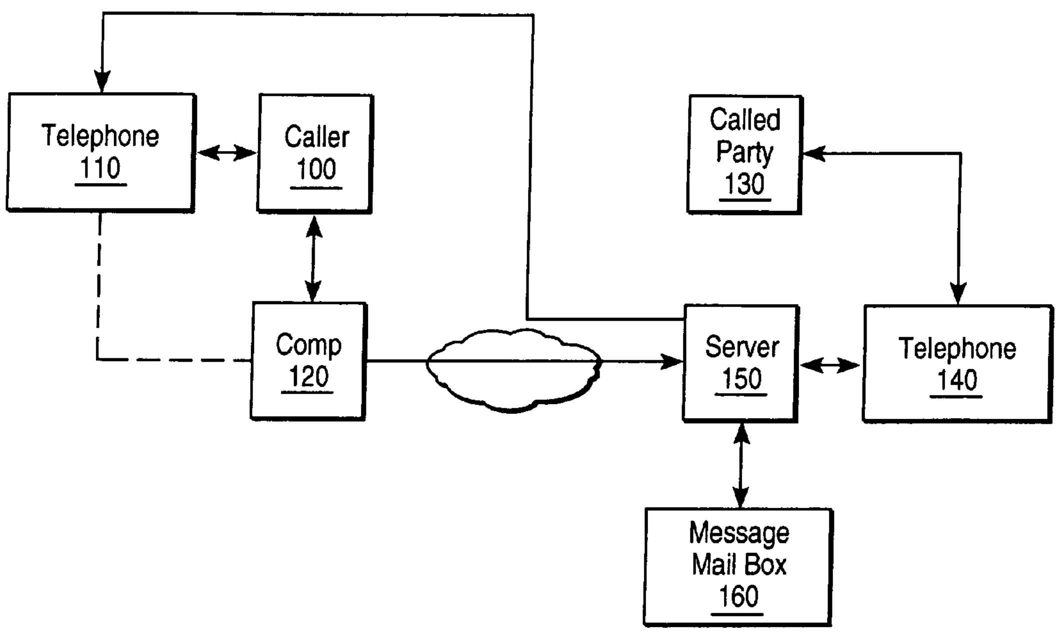
FIG. 2 provides a block diagram for one embodiment of the present invention.

FIG. 2 provides a block diagram for one embodiment of the present invention. In this embodiment, caller 100 has both telephone 110 and personal computer 120 at his disposal. Caller 100 uses telephone 110 and computer 120 to attempt to contact called party 130. Telephone 140, server 150 and message mailbox 160 are associated with called party 130. Caller 100 makes a call request to called party 130 via computer 120. Computer 120 then communicates this request to server 150 via, for example, a direct landline or a telephone network. Server 150 contacts called party 130 via telephone 140. If called party 130 wishes to speak to caller 100, she indicates this via telephone 140. For example, a touch tone driven menu of options can be used to provide the information to server 150 via telephone 140. Server 150 then places a call between telephone 110 and telephone 140. In an alternative embodiment, if called party 130 is not present or refuses to take the call, server 150 provides caller 100 with the option of leaving a message in message mailbox 160.

Figure 3:
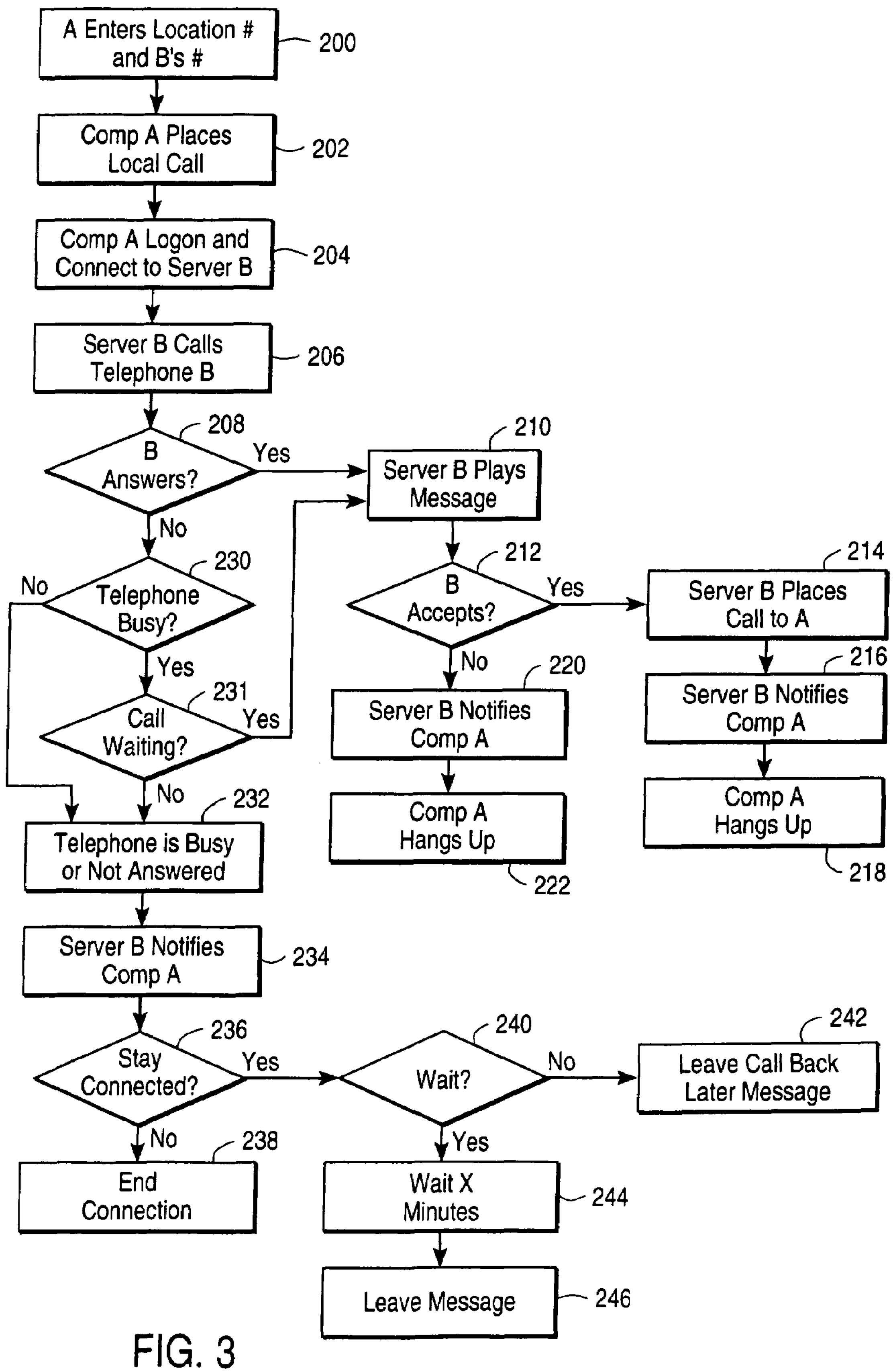
FIG. 3 provides a process flow chart for one embodiment of the present invention.

FIG. 3 provides a process flow chart for one embodiment of the present invention. In this example, Party A is in a hotel room in Florida and wants to reach Party B at her desk in Santa Clara. Party A and Party B may be employees of the same company. Party A could try to make a telephone call to Party B via the telephone network. Party A would then pay hotel long distance charges or go through the inconvenience of using a credit card which results in paying credit card surcharges and higher rates than normal. With the present invention, Party A can use computer assistance to make a connection. This computer assistance can be with, for example, a laptop computer or a PDA. At step 200, Party A enters his location telephone number and Party B's work telephone number. The location telephone number would be the direct dial telephone number for Party A's hotel room in Florida. At step 202, Party A's laptop automatically makes a modem telephone call to the local internet service provider (ISP) network serving the local area (e.g., AT&T, WorldNet or Netcom). Thus, Computer A places a local call from the hotel with the associated local charges.

At step 204, Computer A logs onto the ISP network and connects to a call request server attached to the ISP network as well as Party B's communication system (e.g., a PBX). The function of the call request server can be built into a PBX, but for this example, a separate Server B is provided. The server could also be attached to a central office or to a LAN based real-time communication system or some other type of communication system. There can also be a secondary log on to the call request server to authenticate the identity of Party A before toll charges are incurred by the honoring of the forthcoming call request.

At step 206, the call request Server B calls Party B through, for example, the PBX. At step 208, Party B is given the option of answering the telephone call. If Party B answers the call, the process moves to step 210. At this step, the Server B will play a message. For example, the server message may be, "You have an incoming call back request from . . . ", and the name of Party B can be either replayed from a database or sent via text-to-speech conversion. At step 212, Party B is given the option of either accepting the call and its charges or rejecting the call. If Party B accepts the call, the process moves to step 214. At this step, call request Server B places a call over the public switched telephone network or other discount long distance network. At step 216, call request Server B sends a data message to Computer A over the ISP to instruct Computer A to hang up and to notify Party A that an incoming call will soon follow. At step 218, Computer A hangs up. Alternatively, if Party B rejects the call at step 212, the process moves to step 220. At this step, Server B sends a data message to Computer A over the ISP network to instruct it to hang up and to notify Party A that the call request has been rejected. At step 222, Computer A hangs up.

Moving back to step 208, if Party B does not answer the call, the process moves to step 230. At this step, if Party B's telephone is busy, then the process moves to step 231. If Party B's telephone is not busy, the process moves to step 232. At step 231, if call waiting is available and Party B answers the call waiting system, then the process moves to step 210 as described above. If call waiting is not available or not answered, then the process moves to step 232. At this step, call request Server B will receive a busy signal, voice mail, or a continuous ring signal. At step 234, call request Server B notifies Party A via Computer A that Party B is on the telephone or not answering the telephone. At step 236, Party A is given the option of staying connected. If Party A decides to stop at this point, the connection is ended at step 238. If Party A decides to wait for the outcome, the process moves to step 240. At this step, Party A is given the option of leaving a message or waiting for various periods of time. If Party A chooses not to wait, the process moves to step 242 and Party A can leave a "call me back later" message out of stored personalized messages or enter a different personalized message on Computer A. If Party A decides to wait for a certain period of time, the process moves to step 244. At step 246, a message is left for Party B stating the name of the person waiting (i.e., Party A) and stating that Party A will wait for a certain period of time for a response to his call back request.

In the above example, the call back Server B will always give Party B the option of either accepting the call and its charges or rejecting the call. In either case, the call request server sends a data message to Computer A over the ISP network to instruct it to hang up and to notify Party A that an incoming call will soon follow or that the request has been rejected. If Party A is no longer connected via Computer A, that information is provided back to Party B in the form of another message to the call back request Server B which can initiate another voice call to notify Party B. Because Computer A may be being used to retrieve E-mail or perform other functions on the data network, it is conceivable that Party A will stay connected long enough for Party B to initiate the call back while Party A is still connected.

If a "call me back later" message is left for Party B, it will also state that Party A tried to reach Party B. The message can ask for an immediate call back or a later call back, and can be left in many ways. For example, notification can be left for Party B in the form of a voice mail message based on a message sent from Computer A to Server B. The voice mail system can present Party B with the option of trying to call back Party A. As an alternative, Party B's telephone display can record and display the call back request. Party B may then be able to initiate the call back by pressing a special, pre-programmed function key on Party B's telephone. In yet another embodiment, an E-mail message can be sent. Party B can then reply to this E-mail message to initiate a telephone call to Party A.

Figure 4:
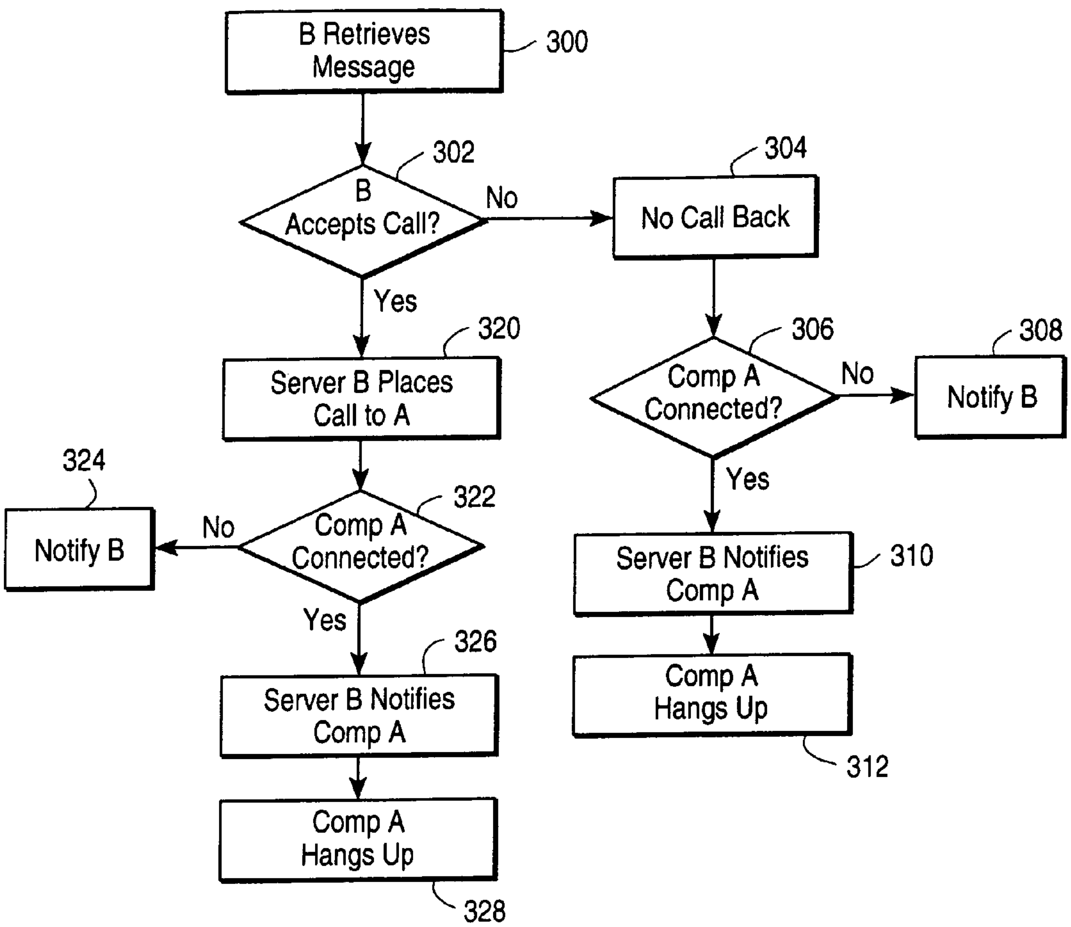
FIG. 4 provides a process flow chart showing an embodiment for a call back based on a message.

FIG. 4 provides a process flow chart showing an embodiment for a call back based on a message. At step 300, Party B retrieves the message from Party A. This message can be, for example, a regular voice mail message or an E-mail message. At step 302, Party B is given the option of accepting or rejecting the call. If Party B rejects the call, the process moves to step 304 and no call back is placed. At step 306, Server B checks if Computer A is still connected. If Computer A is no longer connected, Party B is notified at step 308. If Computer A is still connected, Server B notifies Computer A of the rejection at step 310. Computer A then hangs up at step 312.

If Party B accepts the call at step 302 after retrieving the message, then the process moves to step 320. At this step, Server B automatically places a call to Party A. At step 322, Server B checks to see if Computer A is still connected. If Computer A is not connected, Party B is notified at step 324. If Computer A is still connected, Server B notifies Computer A of the incoming call back at step 326. The notification can come as a voicemail message, an e-mail message, a later voice call, a video message or the like. Computer A then hangs up at step 328.

In an alternative environment, Party B can reject the call back request and disconnect Server B at the same time, such that Party A is not notified of the rejection. This would emulate a disconnected call (e.g., if a modem connection is lost) and could be used if Party B does not want Party A to be notified of the rejection. Alternatively, Party B can send a quick message to Party A along with the notification of the call back request rejection. For example, the message may state "late for a meeting" or "I will call you next week." In the preferred embodiment, Server B sends this message with the notification sent to Computer A.

In yet another alternative embodiment of the present invention, if Party A utilizes a LAN in the workplace or a wireless PDA, a connection can be made without tying up any telephone lines. For example, if Party A is using a wireless PDA and a call back request is sent to Party B, Party A can then use the hotel telephone line to call someone else (e.g., his family). If Party B then receives the call request, Party A can be alerted by the PDA to hang up the hotel telephone line to receive the incoming call from Party B. Any data network can be used for the present invention, not just the internet. For example, any data compatible device, including laptops, PDAs and personal communications service (PCS) telephones can be used, and any other method of notification can be used, such as 2-way paging, facsimile, and the like. In addition to voice connections, the present invention can be utilized to establish any real-time connections such as video calls and video conferences in the same manner.

In the above-described examples, various and multiple Internet service providers can be used for implementation. In the preferred embodiment, at least one packet based network is utilized. A packet based network can be used to bypass toll charges. The commercially available services provided by Internet service providers is sufficient for implementation of the present invention.

What is claimed is:

1. A method for providing an automated call connection system comprising the steps of:

a first user contacting a call server to contact a second user;

the first user requesting the server to deliver a call back request to the second user, the first user awaiting a result of the call back request after the requesting;

the server immediately attempting to contact the second user based on the first user requesting, without requiring the first user to have already attempted to directly contact by telephony the second user;

the server prompting the second user whether to call the first user back;

the second user optionally signaling acceptance of the call back request to the server; and if the second user signals to accept the call back request, the server sending a message to the first user to instruct the first user to expect an imminent callback and automatically attempting to connect the first user and the second user.

2. The method of providing an automated call connection system as defined in claim 1, further comprising the step of: the server using a separate packet-based network to determine if the second user is ready to accept the call back request.

3. The method of providing an automated call connection system as defined in claim 1, further comprising the step of: the server bypassing call toll charges by using a packet-based network for the sending of call back requests.

4. The method of providing an automated call connection system as defined in claim 1, in which the server initiates a call from a device of the second user to a device of the first user.

5. The method of providing an automated call connection system as defined in claim 1, wherein the first user's request for a call back is sent via at least one of an E-mail message, a pager and a facsimile.

6. The method of providing an automated call connection system as defined in claim 1, wherein the prompt is provided to the second user on a telephone display.

7. The method of providing an automated call connection system as defined in claim 1, wherein the first user uses a voice mail system to request the call back.

8. The method of providing an automated call connection system as defined in claim 1, further comprising the step of:

maintaining a connection between the first user and the second user for a predetermined period of time;

wherein the predetermined period of time is specified by the first user.

9. The method of providing an automated call connection system as defined in claim 1, wherein the first user is provided with the option of placing a message in a voice mail system if the call back request is refused.

10. The method of providing an automated call connection system as defined in claim 1, wherein a personal digital assistant is used by the first user to request the call back.

11. A system for providing an automated call connection comprising:

a first user input device for initiating and sending a call back request;

a second user output device for receiving the call back request, without requiring the first user to have already attempted to directly contact by telephony the second user; and a server for transferring, immediately after the sending the call back request, the call back request from the first user input device to the second user output device while the first user input device awaits a result of the call back request and for prompting the second user whet her to call back the first user, and if the second user signals to the network connection to return the call, for immediately and automatically attempting to connect the first user and the second user, the server sending a message to the first user input device to instruct the first user to expect an imminent callback, wherein the second user is a person sought to be contacted by the first user.

12. The system for providing an automated call connection as defined in claim 11, wherein the server connects to a separate packet-based network, the separate packet-based network determining if the second user is ready to accept the call back request.

13. The system for providing an automated call connection as defined in claim 12, wherein call toll charges are bypassed through use of the packet based network.

14. The system for providing an automated call connection as defined in claim 11, wherein the first user input device is at least one of a personal data assistant, a computer, a telephone and a facsimile machine.

15. The system for providing an automated call connection as defined in claim 11, wherein the second user output device is at least one of a personal data assistant, a computer, a telephone and a facsimile machine.

16. The system for providing an automated call connection as defined in claim 11, wherein the first user's call back request is sent via at least one of an E-mail message, a pager and a facsimile device.

17. The system for providing an automated call connection as defined in claim 11, wherein the first user uses a voice mail system to request the call back.

18. The system for providing an automated call connection as defined in claim 11, wherein the network connection is maintained for a predetermined period of time, and the predetermined period of time is specified by the first user.

19. A method for providing an automated call connection system comprising the steps of:

a first user contacting a call server;

the first user requesting the server to deliver a call back request to a second user, the first user awaiting a result of the call back request after the requesting;

the server immediately attempting to contact the second user based on the first user requesting, without requiring the first user to have already attempted to directly contact by telephony the second user;

the server prompting the second user whether to call the first user back;

the second user optionally signaling acceptance of the call back request to the server; and if the second user signals to accept the call back request, the server sending a message to the first user to instruct the first user to expect an imminent callback and automatically attempting to connect the first user and the second user.

20. A system for providing an automated call connection, comprising:

a first user input device for initiating and sending a call back request;

a second user output device for receiving the call back request; and a server for transferring, immediately after the sending the call back request, the call back request from the first user input device to the second user output device while the first user input device awaits a result of the call back request and for prompting the second user whether to call back the first user, without requiring the first user to have already attempted to directly contact by telephony the second user, and if the second user signals to the network connection to return the call, for sending a message to the first user input device to instruct the first user to expect an imminent callback and immediately and automatically attempting to connect the first user and the second user.

21. A method of providing an automated call connection system, the method comprising the steps of:

a first user contacting a call server to contact a specific person, hereinafter referred to as second user;

the first user requesting the server to deliver a call back request to the second user;

wherein the first user awaits result of the call back request after the requesting;

the server immediately attempting to contact the second user based on the first user requesting;

the server prompting the second user whether to call the first user back;

the second user optionally signaling acceptance of the call back request to the server; and if the second user signals to accept the call back request, the server automatically attempting to connect the first user and the second user, wherein the server automatically attempting step comprises sending a message to the first user to instruct the first user to expect an imminent callback.

* * * * *